Sept. 16, 1924.  1,509,022

E. E. NOBLE

CLAMP

Filed July 16, 1923

Ernest E. Noble  Inventor by Wilkinson & Giusta

Attorneys.

Patented Sept. 16, 1924.

1,509,022

UNITED STATES PATENT OFFICE.

ERNEST E. NOBLE, OF LEAD, SOUTH DAKOTA.

CLAMP.

Application filed July 16, 1923. Serial No. 651,956.

*To all whom it may concern:*

Be it known that I, ERNEST E. NOBLE, a citizen of the United States, residing at Lead, in the county of Lawrence and State of South Dakota, have invented certain new and useful Improvements in Clamps; and I do hereby declare the following to be a full, clear, and exact description of the invention, such as will enable others skilled in the art to which it appertains to make and use the same.

The present invention relates to improvements in clamps, and an object thereof is to provide a clamp in which the number of securing bolts and nuts is reduced and in which the parts of the clamp are associated for quick tightening and loosening to afford convenient and ready adjustments.

Another object of the invention resides in providing a clamp in which the parts interfit and cooperate in a novel and improved manner with but the use of a single bolt by which both parts of the clamp are drawn tightly together about the object.

A further object of the invention resides in providing a compact, simple and inexpensive clamp useful for a great variety of purposes and being particularly of use in connection with drilling machines.

With the foregoing and other objects in view, the invention consists in the construction, combination and arrangement of parts more fully described hereinafter and more particularly pointed out in the appended claims.

In the drawings, wherein like symbols refer to like or corresponding parts throughout the several views, Fig. 1 is a fragmentary view showing a drilling machine with the invention applied thereto.

Figure 1:
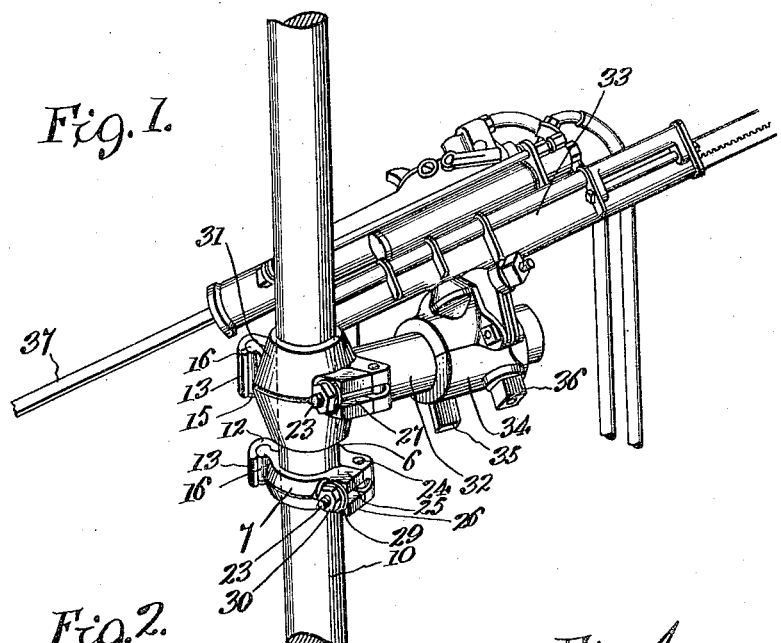

Referring more particularly to the drawings, 6 and 7 designate generally the two parts or elements which go to make up the clamp, these elements having complementary formed surfaces for fitting about an object. The surfaces shown are the semi-cylindrical depressions 8 and 9, which are made opposite one another, and which, when brought together, form a cylindrical bearing for fitting about a part, such as the drill column 10 shown in Fig. 1. The parts 6 and 7 of the clamp are made of cast iron or other appropriate material, and the intermediate portions thereof are preferably ribbed or bulged outwardly as indicated at 11 in order to impart strength and the necessary weight. At one end of the clamp member 6 is a head 12 projecting substantially radially from the cylindrical bearing formed by the two members, and the head lies substantially at the point of contact between the two members, except that the outer portion of the head overlaps the radial line of contact and provides an outer retaining wall 13, which is curved and forms a portion of the generally cylindrical recess 14, which is made in the head 12. This recess 14 traverses substantially the entire depth or height of the head, except that the recess does not open through the base of the head, but a bottom or end 15 is left, which bottom or end is preferably a part of the metal integral with the head 12. This bottom or end 15 is of a substantial construction sufficient for supporting the trunnion 16 carried by the corresponding end of the component clamp member 7. The trunnion is rounded or cylindrical, resembling substantially a roller, and it is of a size to fit within the recess 14 snugly enough to avoid any rattling or loose play, but at the same time sufficiently free to permit of the free rotation of the clamp members at this end. The trunnion 16 is an enlarged part of the end of the clamp member 7, and a reduced neck 17 connects the trunnion with the end portion of the member. This reduced neck fits within a slot made in the recess 14. This slot extends about substantially a quadrant length and begins at the shoulder or face 18, which extends in a radial line passing through the center of the recess 14 and the center of the clamp cylinder, this shoulder or face 18 being formed by an enlargement of the clamp member at this point, the enlargement being made toward the other clamp member. This other clamp member 7 is provided with a similar shoulder or face 19 adapted to co-act with the shoulder or face 18 in the manner indicated in Fig. 2. That is, these two shoulders or faces are adapted to abut and to come in contact throughout their entire areas when the clamp is closed, but of course, these faces or shoulders move away from one another as the two members of the clamp are folded out about the pivot point provided by the recess and trunnion. The neck 17 therefore extends almost radially or inwardly from the trunnion 16, but at a slight angle, the shoulder 19 being substantially formed upon the neck. This neck is smaller than the slot in the recess 14 in order to enable considerable play in the opening and closing of the clamp.

The opposite end of the clamp member 6 is bifurcated or made with upper and lower ears 20 and 21, providing therebetween a slot opening substantially horizontally upon the sides and upon the end of the clamp member. In this slot is fitted the head or the eye 22 of a hinged bolt 23. A rivet or pivot 24 passes through the ears and through the eye of the bolt for securing the bolt in the member 6 while permitting it to swing freely. The opposite clamp member 7 is formed at this end with lugs 25 and 26 with a slot 27 therebetween of a size and shape for fitting the shank of the bolt 23. The slot 27 is, of course, open at its outer end to permit the bolt to swing into the same, and the faces 28 of the lugs and adjacent parts of the clamp member are made flat to receive the washer 29, which is urged against these surfaces by the nut 30 screwed upon the bolt 23.

Figure 2:
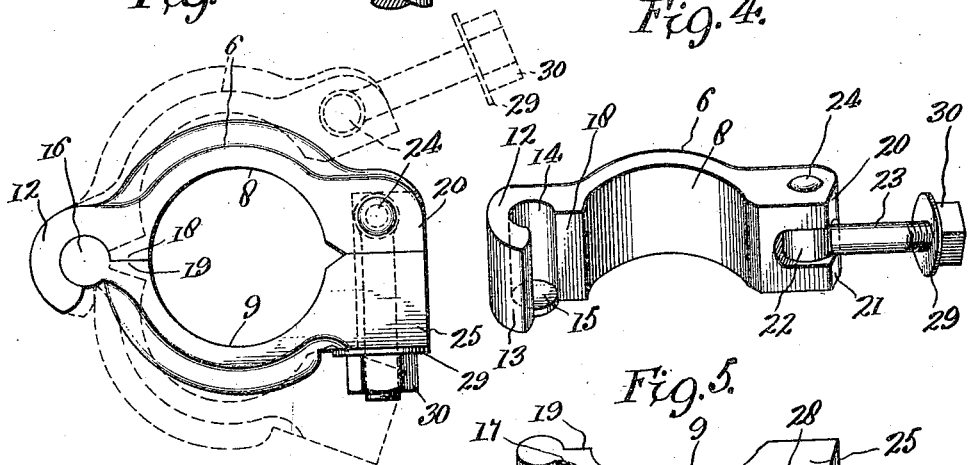
Fig. 2 is an enlarged plan view of the improved clamp with the open position indicated in dotted lines.
Figure 4:
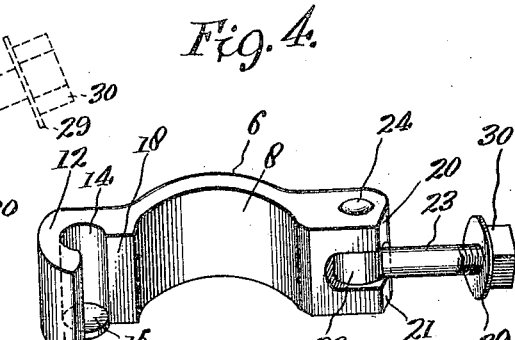
Fig. 4 is a perspective view of one member of the clamp.
Figure 5:
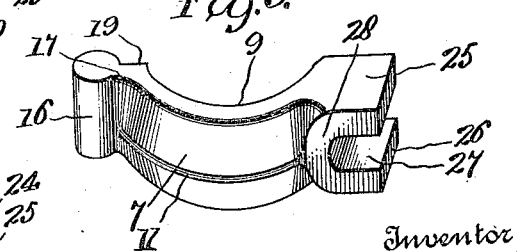
Fig. 5 is a similar view of the component member.
Figure 3:
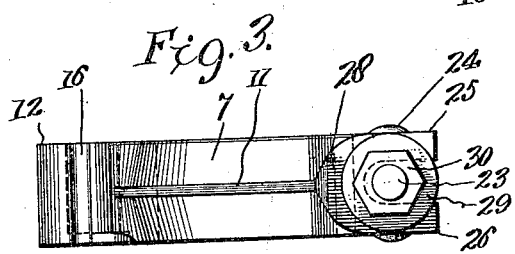
Fig. 3 is an end view of the clamp as shown in Fig. 2.

The clamp members are associated by fitting the trunnion 16 longitudinally or axially into the recess 14 whereupon the members cannot be separated except through a similar axial relative movement in the opposite direction. The members are free to swing toward and from one another and the hinged bolt 23 at the opposite end enables the device to be clamped upon the object or removed therefrom. For instance, the clamp may fit about the drill collar 10 as shown in Fig. 1. Normally, the clamp collar may be put in place about the column and removed merely by opening the jaws or parts, but should the column be too wide to pass through the open mouth of the clamp, then the members may be separated by relative axial movement, and withdrawn from the column in this manner. A similar clamp collar is shown at 31 in Fig. 1, also clamped about the drill column 10 for holding the arm 32 upon the column and at the same time admitting of the angular adjustment of the drilling machine 33 about the column or its vertical adjustment thereon. One of the old split collars or clamps is shown at 34 requiring two bolts 35 and 36 to secure the same in place. These bolts must be unfastened at the same time, and they must both be retightened after the adjustment is effected. The drill itself is indicated at 37.

The advantages of the device reside in the saving of the cost of numerous bolts and nuts in setting up the machine and in the subsequent upkeep and the still greater saving of labor in the frequent adjustment of the machine necessary in drilling operations.

After drilling one hole in the position of the machine indicated in Fig. 1, it then becomes necessary to elevate the drill by turning same upon the arm 32 or by swinging the entire drill horizontally upon the column 10. With the old type of clamp it is necessary to unloosen two bolts in the clamps 31 and 34. Also, if the machine 33 is to be adjusted in or out upon the arm 32, or if the arm is to be adjusted up or down upon the drill column, with the old type of clamp two bolts must be loosened and subsequently retightened.

With the present invention only one of the bolts need be operated upon, and this makes it more convenient to effect the adjustment. The drill collar on the column 10 in Fig. 1 is for the purpose of holding the parts while adjusting the collar 31. It is, of course, intended to replace the old collar 34 by one made in accordance with this invention, but this old type of collar has been merely illustrated at this point to show the difference in construction and advantage.

It will, of course, be understood that the improved drill collar may be used for numerous other purposes.

I desire it to be understood that the drawings only show one embodiment of which the invention is susceptible, and those skilled in the art will, of course, be enabled to change the size and proportion of the device and parts thereof and to make other constructional changes therein, but I reserve the right to alter such changes and modifications as come within the scope of the following claims.

I claim:

1. A clamp comprising a substantially semicircular member having a head at one end with a recess therein open at one end only, and having a slot in its side wall, a second substantially semi-circular member having a trunnion fitted axially in said recess and provided with a narrow neck adapted to turn in said slot, and removable fastening means at the other ends of said members.

2. A clamp comprising a pair of complementary members, one of said members having a head thereon projecting radially at substantially the point of contact between the members, said head having an outer part projecting beyond the line of contact, and provided with a shoulder coinciding substantially with the radial line, said head having a slotted recess therein closed at one end, and open at its opposite end, said second clamp member having a trunnion adapted to fit into the open end of said recess and turn freely therein, said second member having a restricted neck adapted to turn in the slot in said recess, said second member also having a shoulder adapted to come in contact with the first mentioned shoulder when the clamp parts are closed, and a hinged bolt carried by one clamp member at the opposite end thereof and adapted to removably engage the other member.

ERNEST E. NOBLE.